United States Patent [19]

Culver

[11] 4,026,029

[45] May 31, 1977

[54] APPARATUS FOR IMPROVING THE ACCURACY OF A FRICTION WHEEL DISTANCE MEASURING DEVICE

[75] Inventor: Irven H. Culver, Playa Del Rey, Calif.

[73] Assignee: Secundus, Inc., San Lorenzo, P.R.

[22] Filed: Dec. 8, 1975

[21] Appl. No.: 638,554

[52] U.S. Cl. .......................... 33/125 M; 33/137 L; 74/29

[51] Int. Cl.[2] .......................... G01B 3/12

[58] Field of Search ........ 33/125 M, 125 R, 141 R, 33/141 B, 141.5, 142, 137 L, 1 M, 80; 74/29, 422

[56] References Cited

UNITED STATES PATENTS

| | | | |
|---|---|---|---|
| 962,776 | 6/1910 | Maranda | 33/76 R |
| 1,598,871 | 9/1926 | Otto | 33/80 |
| 2,064,653 | 12/1936 | Forstrom | 74/422 |
| 3,370,478 | 2/1968 | Martin | 74/422 |
| 3,771,228 | 11/1973 | Culver | 33/125 M |
| 3,854,823 | 12/1974 | Loxham | 250/237 G |

*Primary Examiner*—Richard F. Aegerter
*Assistant Examiner*—John W. Shepperd
*Attorney, Agent, or Firm*—Christie, Parker & Hale

[57] ABSTRACT

A flat strip of metal forms the surface on which the friction wheel of a distance measuring device travels. The angle of the strip relative to the path of movement of the friction wheel is made adjustable. By making the perimeter surface of the friction wheel with striations extending along a skewed angle relative to the axis of rotation and forming the imprint of the friction wheel along the strip by rolling the wheel along the length of the strip. Subsequent slight changes in the angle of the strip relative to the path of movement of the wheel; causes the reading of the distance measuring device to change slightly for a given amount of movement of the device along its path to travel.

12 Claims, 4 Drawing Figures

10 28 30 13 42 26 38 34 32 41 36 40

Fig. 1
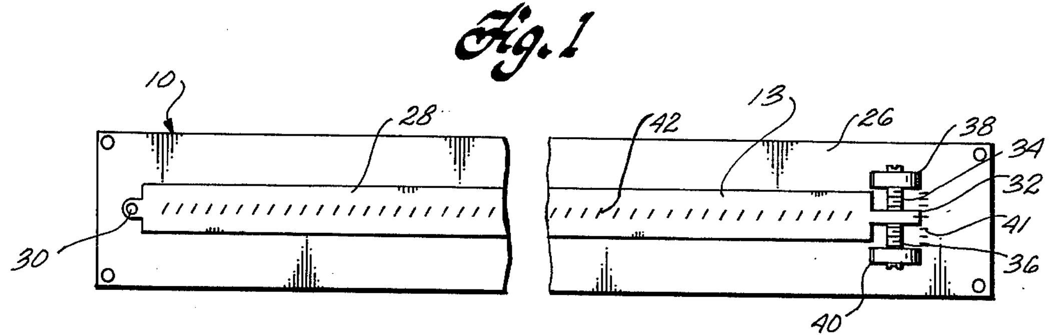
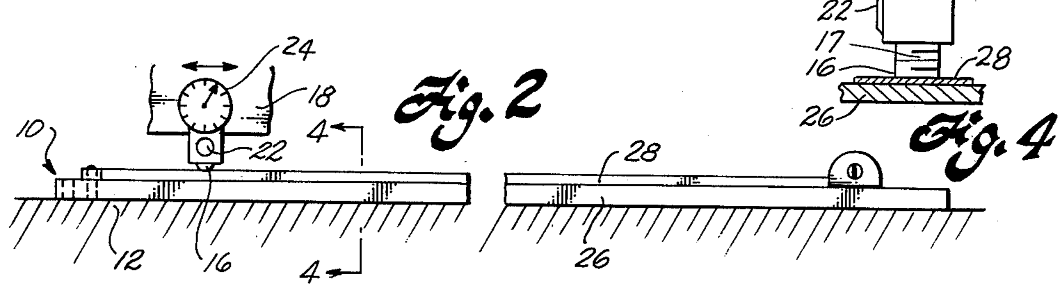
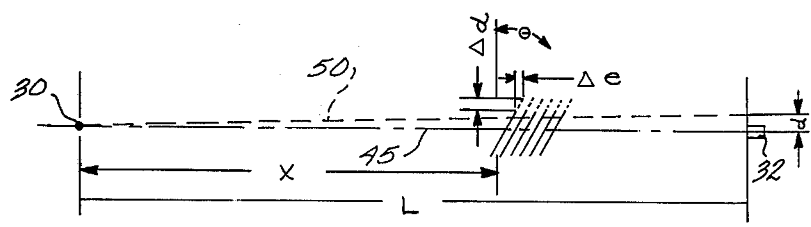
Fig. 3

APPARATUS FOR IMPROVING THE ACCURACY OF A FRICTION WHEEL DISTANCE MEASURING DEVICE

FIELD OF THE INVENTION

This invention relates to friction wheel type distance measuring devices for use with machine tools or the like, and more particularly, is concerned with an arrangement for adjusting the calibration of such measuring devices in use.

BACKGROUND OF THE INVENTION

In U.S. Pat. No. 3,378,929 there is described a precision friction wheel distance measuring device which is particularly adapted for use in combination with machine tools where the device is used to measure the distance one part of the tool is moved relative to another part. For example, the measuring device may be mounted on a lathe carriage with a motion sensing wheel of the device engaging a guideway surface of the lathe bed to measure the distance the carriage is moved along the bed. Originally the sensing wheel was formed with a cylindrical surface. Subsequently it was discovered that measurement errors were encountered using such devices due to a phenomenon known as "metal elastic crowding" which varies in magnitude depending upon the difference in elastic properties of the sensing wheel and the metal defining the surface (the "measurement surface") track along which the wheel rolls. The wheel is made of a metal which is generally harder than the metal defining the measurement surface. Since this phenomenon, metal elastic crowding, tends to make the wheel appear to have a greater diameter than actually measured on a static basis, it was found the reading of the device could be corrected by changing the effective diameter of the wheel, as by giving the peripheral surface of the wheel a spherical contour and adjusting the tilt angle of the axis of rotation to change the effective radius of the wheel. By mounting the device so that the plane of rotation of the sensing wheel can be tilted out of exact perpendicularity to the measurement surface, the indicated measurement by the device can be adjusted by an amount adequate to correct for the effects of metal elastic crowding. However, the mounting which provides the tilting adjustment required to calibrate the instrument complicates the installation and increases the cost.

While tilting of the spherically contoured wheel permits adjustment to provide a virtually exact measurement accuracy, the repeatability of the device, namely, the ability of the device to read zero when returned to its original position after traversing the normal length of its travel, still remained a problem. In U.S. Pat. No. 3,771,228 there is described an arrangement for improving the repeatability of measurements by forming the sensing wheel with a plurality of ridges extending parallel to the axis of rotation and which are randomly spaced about the periphery of the wheel. Such ridges are formed, for example, by grinding the surface of the sensing wheel in a direction transverse to the circumference of the wheel.

The sensing wheel of these devices originally was formed with a smooth peripheral surface, whether or not the surface was spherically contoured. The wheel, in use, was forcefully engaged with the measurement surface and rolled faithfully along the surface due to friction. Hence, the term "friction" has been used in the art to describe the general type of measuring device to which this invention pertains. The wheel has also been referred to in the art as a "metering" wheel because, as it rolls along the measurement surface in use of the device, it meters the distance traversed by the device along the measurement surface. However, with the advent of fine striations in the peripheral surface of the sensing wheel in directions other than purely circumferentially of the wheel, it is seen that the term "friction", in the strictest sense of the word, is somewhat of a misnomer. Nevertheless, the term "friction" is used herein with reference to the sensing wheel because of the widespread acceptance of this term as descriptive of this type of measuring device.

SUMMARY OF THE INVENTION

The present invention is directed to an arrangement for adjusting the measurement accuracy of a friction wheel type measuring device. The present invention has the advantage that the accuracy adjustment can be made without recourse to tilting or in any way adjusting the position of the measuring device itself relative to the part to which it is mounted. As a result, the friction wheel may be made cylindrical rather than spherical in contour. The measurement accuracy of the device may be adjusted by providing a track assembly having an elongated surface along which the friction wheel of the device rolls. The friction wheel has a peripheral surface on which a plurality of closely spaced striations or ridges are formed, as by grinding, the striations extending at an angle which is at a skew relative to the axis of rotation of the wheel. After the friction wheel has been rolled along the length of the surface of the track assembly, imprinting the pattern of the striations into the surface of the track assembly, the output reading of the device can be adjusted by changing slightly the angle of the elongated imprinted path on the surface relative to the actual path traversed by the friction wheel.

DESCRIPTION OF THE DRAWINGS

For a better understanding of the invention, reference should be made to the accompanying drawings, wherein:

FIG. 1 is an elevational view of the track assembly;

FIG. 2 is an side view showing the postion of the measuring device relative to the track assembly;

FIG. 3 is a diagram showing how the adjustment is produced, and

FIG. 4 is a cross-sectional view taken on the line 4—4 of FIG. 2.

DETAILED DESCRIPTION

Referring to the drawings in detail, the numeral 10 indicates generally a track assembly which is bolted or otherwise secured to the bed 12 of a machine tool or the like. The track assembly provides a measurement surface 13 along which a friction wheel 16 of a measurement device 18 is caused to roll. The measuring device 18, which is of a type described in the above-identified U.S. Pat. No. 3,378,929, is adapted to be mounted on a carriage or other moving member 20 which moves longitudinally of the bed 12. The friction wheel 16 can be cylindrical or spherical in contour and is ground with striations around the perimeter skewed to the axis of rotation of the wheel. The angle of skew is preferably in the range of 15° to 25°. Rotation of the wheel 16 operates through suitable gearing in the housing of the device, a course readout dial 22 and a micrometer indicating dial 24. If desired, the device may include an electrical signal generator, operated by rotation of the wheel for generating electrical signals indicative of selected increments of wheel rotation, the signals being applied via suitable conductors to a display panel for visually presenting, in desired units of measure, the measurement mode by the device at a location spaced from the location of the device itself.

The track assembly 10, as shown in detail in FIGS. 1 and 2, includes a frame member 26 which is arranged to be bolted or otherwise secured to one of the two moving elements, such as the bed 12 of the machine tool. A track member 28, in the form of a flat steel plate running longitudinally along the length of the frame member 26, provides the measurement surface 13 on which the friction wheel 16 of the measuring device is caused to roll by relative movement between the bed and carriage of the machine tool, or other relatively moving parts whose displacement is being measured. The track member 28 is pivoted preferably at one end, by means of a pin 30 extending through a hole in the track member 28 and engaging the frame member 26. The end of the track member 28 remote from the pivot is provided with a projecting lug 32 which is engaged on either side by a pair of axially aligned adjusting screws 34 and 36. The screws 34 and 36 threadedly engage mounting flanges 38 and 40 secured to and projecting from the surface of the frame member 26. The axis of the adjusting screws extend parallel to the mating surface between the frame member 26 and the track 28, so that adjustment of the screws operates to rotate the track member 28 about the pivot 30. A scale 41 may be provided for indicating the angular position of the track member 28.

In operation, the track assembly 10 is secured to the bed of a machine tool, for example, and the friction wheel measuring device 18 is mounted on a moving carriage of the machine tool in the usual manner. The track assembly 10 is aligned with the direction of travel of the carriage so that movement of the carriage causes the friction wheel 16 to roll along the length of the track member 28. Initially, the track member is positioned at a midpoint on the scale 41 so that it extends parallel to the path of the friction wheel. The friction wheel is then biased into forceful engagement with surface 13 of the track member. The perimeter of the friction wheel is made harder than the metal defining the measurement surface. The friction wheel of the measuring device is then rolled along the measurement surface of the track member. Because the harder wheel is forcefully biased into contact with the track member, the skewed striations on the surface of the friction wheel form an imprint pattern 42 along the length of the measurement surface. The imprint pattern 42 consists of a pattern of ridges and grooves impressed on the surface of the track member 28, which ridges and grooves extend at an acute angle relative to the longitudinal wheel as it rolls along the track. The mating of the striations on the wheel with the pattern 42 on the track insures repeatability of the measurement as the friction wheel is repeatedly rolled back and forth along the length of the track member, since the pattern of striations on the wheel meshes with the pattern formed on the surface of the track. Thereafter, an adjustment of the screws 34 and 36 to change the angle of the track slightly changes the reading of the dial at any given distance from the pivot by an incremental amount.

FIG. 3 is a diagrammatic representation of the track assembly before and after adjustment to compensate for measurement errors due to the effect of metal elastic crowding. In FIG. 3, line 45 represents the centerline path of the movement of the friction wheel 16 along the measurement surface 13 of track member 28 prior to adjustment of the track assembly, and line 50 represents the path of movement of the wheel along the track member after the adjustment has been made. The amount of adjustment is exaggerated for the purpose of illustration. Normally the angle between lines 45 and 50 is very small and can be considered as substantially zero in the following analysis. In each case, the total length of the imprint pattern 42 is distance L. The angle made by individual features of the imprint pattern relative to line 45 is angle $\theta$, the angle of skew of the friction wheel striations relative to the wheel axis.

If, after the initial imprint is formed along the line 45, the angle of the track is changed slightly, and the wheel caused to roll along the line 50, the ridges on the wheel will still engage the same grooves in the initial imprint, but the grooves will be extended along the skew angle by the displacement between the two paths. It will be apparent from FIG. 3 that at some radial distance from the pivot 30, a lateral displacement of $\Delta d$ between the lines 45 and 50 corresponds to a shift $\Delta e$ in the perimeter of the wheel, where $\Delta e = \Delta d \tan \theta$.

After the imprint pattern 42 has been impressed on the track member as described above, and prior to any angular adjustment of the track member about its pivot 30, the measuring device is moved a known distance along the measurement surface, and the distance traveled as measured by the device is observed and compared to the known distance. The known distance can be ascertained or defined with accuracy, as by the use of Johanason blocks, for example. Because of the effects of metal elastic crowding, the observed measured distance may be different from the known distance actually traveled by the measuring device along the measurement surface. This difference is the measurement error E which is to be corrected by adjustment of the tract member angularly about pivot 30.

To make the desired adjustment, the measuring device is moved along the measurement surface to near pivot 30. The other end of the track member is then adjusted up or down, as appropriate, by operation of screws 34 and 36, to move the adjustable end of the track member a distance (see FIG. 3) which is related to the measurement error E by the relation $d \tan \theta = E$. The friction wheel is kept in engagement with the measurement surface and the track member is adjusted about its pivot 30, thereby to assure that the striations on the friction wheel maintain registry with the imprint pattern 42 on the track member.

The effect of the angular adjustment of the track member about pivot 30, so far as the friction wheel is concerned, is to lengthen or shorten the imprint pattern 42, proportionally along its entire length, by an amount sufficient to cancel the measurement error. The adjustment distance $d$ is very small, normally on the order of a few thousandths of an inch for each 6 inches of the length of track member 28. Accordingly, after the position of the track member has been adjusted, subsequent movement of the measuring device along the track assembly causes the imprint pattern 42 to control rotation of the friction wheel, even though the attitude of the imprint pattern relative to the wheel is different from the attitude of the pattern relative to the wheel as a result of initial creation of the pattern by the wheel.

Stated in another way, the angular adjustment of the track member about pivot 30 changes by a slight amount, the spacing between adjacent feature of the imprint pattern as seen by the friction wheel. The total correction for measurement error is distributed pro rata between the individual features of the imprint pattern. In this way, measurement accuracy is assured for displacement of the friction wheel along the track member through distances greater or less than the known distance used in making the actual error correction adjustment.

It is preferred that the value of angle $\theta$ is selected so that its tangent has a value in the range of from about 0.3 to about 0.4. If $\theta$ is too small, the adjustment distance $d$ then becomes very large for any significant affect on the output reading of the device. A skew angle of $\theta = 45°$ ($\tan \theta = 1.000$) or greater is not desired because the track assembly is then very sensitive to changes in the angular position of the track member about its pivot.

As noted above, the striations on friction wheel 16 preferably are randomly spaced about the wheel and can be formed by grinding the wheel; see U.S. Pat. No. 3,771,228. It is not essential, however, to the practice of this invention that the striations be randomly spaced about the circumference of the friction wheel; they can be regularly spaced if desired. Regardless of how the striations are formed or how they are spaced, they should be closely spaced and the rest of each striation ridge should be sufficiently sharp to form a distinct groove in the measurement surface 13 of the track member when the friction wheel is rolled along the track member while being forcefully biased into contact with the measurement surface.

From the foregoing it is apparent that the measurement error correction apparatus and procedure described above makes it possible to provide a cylindrical friction wheel and still correct for the effects of metal elastic crowding.

What is claimed is:

1. In a linear measuring system for a machine tool or the like having two relatively moving parts, one part moving in a fixed linear path relative to the other part, wherein a measuring device including a rotating sensing wheel and means driven by the wheel for indicating the extent of rotation of the wheel is secured to said one part of said two relatively moving parts with the sensing wheel in rolling contact with a surface associated with said other moving part, the improvement comprising: a longitudinal track member having a flat elongated surface, mounting means for securing the track member to said other of said two relatively moving parts with said surface extending parallel to said path of movement with the direction of elongation substantially parallel to the path of movement, the elongated surface being in rolling contact with said sensing wheel, said mounting means including means for adjusting the angle between the direction of elongation and said linear path, the perimeter of the wheel having striations extending at a skewed angle to the axis of rotation of the wheel, and the surface of the track member having an imprint of the striated wheel extending substantially the full length thereof.

2. Apparatus of claim 1 wherein the angle of skew is of the order of 15° to 30°.

3. Apparatus of claim 1 wherein the perimeter of the wheel is a cylindrical surface, the surface of the track member being tangent to the cylindrical surface.

4. Apparatus of claim 1 wherein the angular adjustment of said adjusting means limits the maximum displacement of the surface relative to the wheel along the path of the wheel to a distance less than the width of the surface of the wheel in contact with the surface.

5. Apparatus of claim 1 wherein the track member includes a strip of material forming said surface, the strip being of a material having a lesser hardness than the wheel.

6. Apparatus of claim 1 wherein the mounting means includes a frame member, the track member comprising an elongated strip forming said surface, and pivot means securing the strip to the frame member at one end, and adjusting means at the other end of the strip for adjustably shifting said other end about said pivot means.

7. A high accuracy distance measuring system comprising a wheel-driven distance indicator including a wheel and means supporting the wheel for rotation about its axis, the wheel having transverse striations around the perimeter of the wheel extending at a skew angle relative to the axis of rotation of the wheel, an elongated strip having a surface bearing an imprint of the wheel striations along the length thereof, means for rolling the wheel along a fixed linear path along said imprint bearing surface to measure linear displacement of the said wheel axis relative to the surface, means pivotally mounting the strip for rotation about a pivot point in the plane of said surface, means for adjustably securing the strip with the imprint of the wheel of the strip extending at a selected small angle relative to the fixed linear path of movement of said wheel.

8. Apparatus of claim 7 wherein the skew angle of the striations relative to the axis of rotation is between 15° and 30°.

9. Apparatus of claim 7 wherein the range of adjustment of the strip is confined to a maximum displacement less than the width of the wheel imprint on said surface.

10. A method of adjusting the accuracy of a friction wheel type distance measuring device having a friction wheel with skewed striations around the perimeter and an indicator driven by the wheel to indicate the distance the wheel has rolled, comprising the steps of:

rolling the friction wheel along a fixed linear path in contact with an elongated flat surface to be measured to form an imprint of the wheel striations on said surface, moving the measuring device a known distance along said same linear path to determine any error in the distance indication of the measuring device, rotating the flat surface slightly in the plane of said surface about a point lying along the imprint to a position at which the indication of the measuring device in moving along said linear path over said known distance corresponds to the correct distance indication.

11. the method of claim 10 wherein the surface is rotated a maximum amount such that the imprint of the wheel always overlaps to some degree the initial imprint over the full range of travel of the wheel along said same linear path.

12. Measuring apparatus comprising a track member having an elongated flat surface, a measuring device having a wheel, means movably supporting the measuring device with the perimeter of the wheel in rolling contact with the surface of the track, said means moving the wheel across said surface along afixed linear path, the perimeter of the wheel having striations extending at a skewed angle to the axis of rotation of the wheel, the track member having an imprint on said surface of the striations formed from the rolling contact between the wheel and the surface extending lengthwise of the track member, and means for rotating the track member slightly about an axis perpendicular to said surface to change the angle between said fixed linear path traversed by the wheel and the imprint on the surface of the track member.

* * * * *